United States Patent Office.

GEORGE THOMSON AND WILLIAM KEMP, OF ELIZABETH, NEW JERSEY.

PURIFYING SULPHURIC ACID.

SPECIFICATION forming part of Letters Patent No. 314,548, dated March 24, 1885.

Application filed March 7, 1884. (No specimens.)

*To all whom it may concern:*

Be it known that we, GEORGE THOMSON and WILLIAM KEMP, both subjects of the Queen of Great Britain, and residents of Elizabeth, in the county of Union and State of New Jersey, have invented a new and useful Improvement in Processes for Purifying Sulphuric Acid, of which the following is a specification.

In sulphuric acid manufactured from pyrites are usually found certain impurities—such as oxides of nitrogen, arsenic, antimony, &c.—which render such acid unfit for use in many manufacturing establishments, and to remove these and produce an acid which shall be as nearly as possible chemically pure is the object of our invention.

Our improved process may be briefly described as consisting of the following successive steps: first, the precipitation of the above impurities by the addition to the acid of ammonium sulphide; second, the separation from the acid of such precipitated matters by filtration; and, lastly, the expulsion of the final traces of oxide of nitrogen from the acid by the concentration of the latter.

To carry out the several stages of the above process on a manufacturing scale, we proceed as follows: The acid as it comes from the condensing-chamber is run into lead-lined tanks, each usually holding about ten (10) tons. Ammonium sulphide is then added to the acid, which must be well agitated during the operation, so as to bring the ammonium sulphide in contact with every part of it, the result being the precipitation of the metals and other impurities above mentioned contained in the acid. This result is due to the union of the ammonium sulphide with the oxygen of the oxides, thereby converting the latter into sulphides, which are insoluble, and converting the ammonium sulphide into ammonium sulphate, which is soluble, and remains in solution in the acid. We then take the acid and pass it through a filter contained in a lead-lined tank having a perforated diaphragm or false bottom, on which the filtering material rests. The material must be of a substance not acted upon by sulphuric acid, and we find that what will best answer the purpose is finely-divided lead or glass, which we place on the perforated bottom or diaphragm to a depth of from six to twelve inches. The sulphides precipitated with the ammonium sulphide are collected on the top of the filter, and the clear acid runs through into any suitable receiver or into the bottom of the filtering-vessel. The clear acid is then taken from the receiver to lead pans, where it is concentrated by heat. By this operation the last traces of oxides of nitrogen are acted upon by the ammonium sulphate formed during the operation, and are expelled by the heat during the concentration, thus leaving an almost chemically-pure acid.

The commercial value of the acid is much enhanced by our improved process, the cost of which is very small, and will be nearly covered by the value of the by-products.

Having thus described our invention, what we claim as new, and desire to secure by Letters Patent, is—

1. The improved process of purifying sulphuric acid, which consists, essentially, in adding ammonium sulphide to the acid and precipitating the resulting compounds, substantially as set forth.

2. The improved process of purifying sulphuric acid, which consists in adding ammonium sulphide, and then filtering the acid to free it from the resulting precipitate, substantially as set forth.

3. The improved process of purifying sulphuric acid, which consists in first adding ammonium sulphide, then filtering the acid, and finally concentrating it by heat, substantially as set forth.

In witness whereof we have hereunto signed our names in the presence of two subscribing witnesses.

GEORGE THOMSON.
    WILLIAM KEMP.

Witnesses:
 ARTHUR C. FRASER,
 GEO. BAINTON.